US012767797B2

(12) United States Patent
Ma et al.

(10) Patent No.: US 12,767,797 B2
(45) Date of Patent: Oct. 20, 2026

(54) ETHYLENE/ALPHA-OLEFIN INTERPOLYMER BASED COMPOSITIONS WITH EXCELLENT ADHESION PROPERTIES

(71) Applicant: Dow Global Technologies LLC, Midland, MI (US)

(72) Inventors: Wanfu Ma, Shanghai (CN); Allan Walter Mclennaghan, Lachen (CH); Juan C. Tuberquia, Manvel, TX (US); Jozef Van Dun, Antwerp (BE)

(73) Assignee: Dow Global Technologies LLC, Midland, MI (US)

( * ) Notice: Subject to any disclaimer, the term of this patent is extended or adjusted under 35 U.S.C. 154(b) by 435 days.

(21) Appl. No.: 18/263,610

(22) PCT Filed: Apr. 14, 2021

(86) PCT No.: PCT/CN2021/087293
§ 371 (c)(1),
(2) Date: Jul. 31, 2023

(87) PCT Pub. No.: WO2022/217509
PCT Pub. Date: Oct. 20, 2022

(65) Prior Publication Data

US 2024/0101800 A1 Mar. 28, 2024

(51) Int. Cl.
*C08L 23/0807* (2025.01)
*C09J 123/08* (2006.01)

(52) U.S. Cl.
CPC ..... *C08L 23/0815* (2013.01); *C09J 123/0815* (2013.01); *C08L 2205/025* (2013.01); *C08L 2205/035* (2013.01)

(58) Field of Classification Search
CPC ........... C08L 23/0815; C08L 2205/025; C08L 2205/035; C08L 91/00; C08L 91/06; C08L 101/12; C08L 45/00; C09J 123/0815
See application file for complete search history.

(56) References Cited

U.S. PATENT DOCUMENTS

| | | | | |
|---|---|---|---|---|
| 5,548,014 | A | 8/1996 | Tse et al. | |
| 6,107,430 | A | 8/2000 | Dubois et al. | |
| 6,319,979 | B1 | 11/2001 | Dubois et al. | |
| 6,582,829 | B1 | 6/2003 | Quinn et al. | |
| 7,199,180 | B1 | 4/2007 | Simmons et al. | |
| 9,115,299 | B2 | 8/2015 | Hu et al. | |
| 10,385,242 | B2 | 8/2019 | Chen et al. | |
| 2007/0135563 | A1* | 6/2007 | Simmons | B32B 7/12 524/274 |
| 2014/0037876 | A1 | 2/2014 | Esangbedo et al. | |
| 2015/0112014 | A1* | 4/2015 | Tripathy | C09J 123/10 524/528 |
| 2016/0108157 | A1* | 4/2016 | Cerk | C08F 210/16 526/348.2 |
| 2018/0127564 | A1* | 5/2018 | LiPiShan | C08K 3/26 |
| 2021/0198473 | A1* | 7/2021 | Ma | C08L 51/06 |

FOREIGN PATENT DOCUMENTS

| | | | |
|---|---|---|---|
| CN | 1216552 | 5/1999 | |
| CN | 110256987 | 9/2019 | |
| JP | 2004189899 | 7/2004 | |
| WO | 1997033921 | 9/1997 | |
| WO | WO-2007078697 A1 * | 7/2007 | C08L 23/0815 |
| WO | 2015013472 | 1/2015 | |
| WO | 2017102702 | 6/2017 | |
| WO | 2018176250 | 10/2018 | |
| WO | 2019037039 | 2/2019 | |

OTHER PUBLICATIONS

PCT/CN2021/087293, International Search Report and Written Opinion with a mailing date of Jan. 14, 2022.

* cited by examiner

*Primary Examiner* — Doris L Lee

(57) ABSTRACT

A composition comprising the following components: a) a first ethylene/alpha-olefin interpolymer that comprises the following properties: i) a melt viscosity (177° C.) from 2,000 to 50,000 mPa·s, ii) a density from 0.855 to 0.885 g/cc; b) a second ethylene/alpha-olefin interpolymer that comprises the following properties: i) a melt viscosity (177° C.) from 2,000 to 50,000 mPa·s, ii) a density from 0.900 to 0.960 g/cc; and wherein the weight ratio of component a to component b is from 1.0 to 100.

17 Claims, No Drawings

ETHYLENE/ALPHA-OLEFIN INTERPOLYMER BASED COMPOSITIONS WITH EXCELLENT ADHESION PROPERTIES

BACKGROUND OF THE INVENTION

A packaging hot melt adhesive (HMA) is typically formulated with a low viscosity polymer, a tackifier and a wax, to form a final product with a given performance profile. Typical performance measurements for a packaging HMA include the following: a) a suitable viscosity at the application temperature, b) some measure of heat resistance of the bond, such as PAFT and SAFT, c) a measurement of Open Time and Set Time, and d) a measurement of adhesion, usually in terms of fiber tear across a range of temperatures. The design and selection of the polymer component can have an impact on all these performance properties to a greater or lesser extent. There is a need for packaging hot melt adhesives, especially non-functionalized formulations, that have both very high heat resistance and good low temperature adhesion performance.

U.S. Pat. No. 7,199,180 discloses adhesives and processes for preparing the same. An adhesive comprises at least one homogeneous ethylene/alpha-olefin interpolymer, and optionally at least one tackifier, and optionally at least one plasticizer. The adhesives are useful in various applications, such as in masking tape, clear office tape, labels, decals, bandages, decorative and protective sheets (such as shelf and drawer liners), floor tiles, sanitary napkin/incontinence placement strips, sun control films, automotive gaskets, packaging, book binding, nonwoven articles, and insulation (see abstract). This reference discloses many adhesive compositions, including those containing two ethylene/alpha-olefin interpolymers. See, for example, Tables 1-3, 6, 8, 9A, 16A, 16B, 18B and 18C.

U.S. Publication 2014/0037876 discloses an adhesive that comprises the following: (a) a mixture of 1:1 to 5:2 of a metallocene catalyzed polyolefin copolymer with a density greater than or equal to 0.880 g/cm$^3$, to a metallocene catalyzed polyolefin copolymer with a density less than 0.880 g/cm$^3$, (b) a compatible tackifier, and (c) a compatible wax (see abstract). The adhesive is disclosed as useful for multilayered structures, such as a laminate of a composite film and a KRAFT paper substrate (see abstract).

U.S. Pat. No. 6,319,979 discloses packages, cartons, cases, and trays comprising a hot melt adhesive, which in turn, comprises at least one homogenous linear or substantially linear ethylene polymer, having a particular density and melt viscosity at 350° F. (177° C.); up to 60 weight percent wax; and up to 40 weight percent tackifier (see abstract). In particular, a hot melt adhesive characterized as follows: a) at least one homogeneous linear or substantially linear interpolymer of ethylene with at least one C3-C20 alpha-olefin interpolymer, having a density from 0.850 g/cm$^3$ to 0.895 g/cm$^3$; and b) up to 60 weight percent of at least one tackifying resin; c) up to 40 weight percent of at least one wax. The hot melt adhesive has a viscosity less than about 5,000 cPs at 150° C. (see abstract). The adhesive may contain a blend of interpolymers (see column 13, lines 19-33).

International Publication WO2017/102702 discloses a hot melt adhesive composition composed of the following: A) at least one metallocene catalyzed ethylene based plastomer, being a copolymer of ethylene and a C4 to C10 alpha olefin with (i) a density in the range of 855 to 910 kg/m$^3$, (ii) an MFR2 (190° C., 2.16 kg) in the range of 55 to 100 g/10 min, (iii) a viscosity at 0.05 rad/s and 177° C. from 100 Pa·s to 200 Pa·s (1 Pa·s=1000 mPa·s), (iv) a molecular weight distribution (Mw/Mn) in the range of 2.6 to 3.5; B) optionally one or more tackifiers; and/or C) one or more plasticizers; and/or D) one or more waxes (see claim 1).

U.S. Pat. No. 6,582,829 discloses a hot melt adhesive composition comprising the following: a) from about 5 wt % to about 50 wt % of at least one homogeneous linear or substantially linear ethylene/alpha-olefin interpolymer, characterized as having a density from 0.850 to 0.965 g/cm$^3$; b) from about 1 wt % to about 40 wt % of at least one block copolymer; and c) from about 10 wt % to about 75 wt % of at least one tackifying resin (see abstract).

Additional adhesive compositions are disclosed in the following references: U.S. Pat. No. 9,115,299; International Publications WO2019/037039, WO2018/176250 and WO2015/013472.

However, as discussed above, there remains a need for packaging hot melt adhesives, especially non-functionalized formulations, that have both very high heat resistance and good low temperature adhesion performance. This need has been met by the following invention.

SUMMARY OF THE INVENTION

A composition comprising the following components:

a) a first ethylene/alpha-olefin interpolymer that comprises the following properties:
   i) a melt viscosity (177° C.) from 2,000 to 50,000 mPa·s,
   ii) a density from 0.855 to 0.885 g/cc;
b) a second ethylene/alpha-olefin interpolymer that comprises the following properties:
   i) a melt viscosity (177° C.) from 2,000 to 50,000 mPa·s,
   ii) a density from 0.900 to 0.960 g/cc; and wherein the weight ratio of component a to component b is from 1.0 to 100.

DETAILED DESCRIPTION OF THE INVENTION

Compositions have been discovered that have high heat resistance and excellent adhesive across a wide range of temperatures. As discussed a composition is provided that comprises the following components:

a) a first ethylene/alpha-olefin interpolymer that comprises the following properties:
   i) a melt viscosity (177° C.) from 2,000 to 50,000 mPa·s,
   ii) a density from 0.855 to 0.885 g/cc;
b) a second ethylene/alpha-olefin interpolymer that comprises the following properties:
   i) a melt viscosity (177° C.) from 2,000 to 50,000 mPa·s,
   ii) a density from 0.900 to 0.960 g/cc; and wherein the weight ratio of component a to component b is from 1.0 to 100.

The above composition may comprise a combination of two or more embodiments, as described herein. Each component of the composition may comprise a combination of two or more embodiments, as described herein.

In one embodiment, or a combination of two or more embodiments, each described herein, the density ratio of component b to component a is ≥1.02, or ≥1.03, or ≥1.04, or ≥1.05, or ≥1.06. In one embodiment, or a combination of two or more embodiments, each described herein, the density ratio of component b to component a is ≤1.12, or ≤1.11, or ≤1.10 or ≤1.09, or ≤1.08.

In one embodiment, or a combination of two or more embodiments, each described herein, the weight ratio of component a to component b is ≥1.0, or ≥1.2, or ≥1.4, or ≥1.6, or ≥1.8, or ≥2.0, or ≥2.2, or ≥2.4, or ≥2.6, or ≥2.8, or ≥3.0. In one embodiment, or a combination of two or more embodiments, each described herein, the weight ratio of component a to component b is ≤90, or ≤80, or ≤70, or ≤60, or ≤50 or ≤40, or ≤30, or ≤20 or ≤15, or ≤10 or ≤9.5, or ≤9.0, or ≤8.5 or ≤8.0, or ≤7.5 or ≤7.0.

In one embodiment, or a combination of two or more embodiments, each described herein, the melt viscosity (177° C.) ratio of component b to component a is ≥0.80, or ≥0.85, or ≥0.90, or ≥0.95, or ≥1.00, or ≥1.02, or ≥1.05. In one embodiment, or a combination of two or more embodiments, each described herein, the melt viscosity (177° C.) ratio of component b to component a is ≤1.20, or ≤1.15, or ≤1.12, or ≤1.10 or ≤1.08.

In one embodiment, or a combination of two or more embodiments, each described herein, the first ethylene/alpha-olefin interpolymer (component a) is an ethylene/alpha-olefin copolymer.

In one embodiment, or a combination of two or more embodiments, each described herein, the second ethylene/alpha-olefin interpolymer (component b) is an ethylene/alpha-olefin copolymer.

In one embodiment, or a combination of two or more embodiments, each described herein, the composition comprises ≥30 wt %, ≥32 wt %, or ≥34 wt %, or ≥36 wt %, or ≥38 wt % of the sum of components a and b, based on the weight of the composition. In one embodiment, or a combination of two or more embodiments, each described herein, the composition comprises ≤50 wt %, or ≤48 wt %, ≤46 wt %, or ≤44 wt %, or ≤42 wt % of the sum of components a and b, based on the weight of the composition.

In one embodiment, or a combination of two or more embodiments, each described herein, the composition further comprises a wax (component c).

In one embodiment, or a combination of two or more embodiments, each described herein, the wax (component c) has a melt viscosity (135° C.)≥1.0 mPa·s, or ≥2.0 mPa·s, or ≥3.0 mPa·s, or ≥4.0 mPa·s, or ≥5.0 mPa·s, or ≥6.0 mPa·s. In one embodiment, or a combination of two or more embodiments, each described herein, the wax (component c) has a melt viscosity (135° C.)≤50 mPa·s, or ≤45 mPa·s, or ≤40 mPa·s, or ≤35 mPa·s, or ≤30 mPa·s, or ≤25 mPa·s, or ≤20 mPa·s, or ≤18 mPa·s, or ≤14 mPa·s, or ≤12 mPa·s, or ≤10 mPa·s.

In one embodiment, or a combination of two or more embodiments, each described herein, the weight ratio of component c to component b is ≥0.5, or ≥1.0, or ≥1.5, or ≥2.0, or ≥2.5, or ≥3.0. In one embodiment, or a combination of two or more embodiments, each described herein, the weight ratio of component c to component b is ≤6.0, or ≤5.5, or ≤5.0, or ≤4.5, or ≤4.0.

In one embodiment, or a combination of two or more embodiments, each described herein, the composition further comprises a tackifier (component d).

In one embodiment, or a combination of two or more embodiments, each described herein, the weight ratio of component d to component b is ≥1.0, or ≥1.2, or ≥1.4, or ≥1.6, or ≥1.8, or ≥1.9. In one embodiment, or a combination of two or more embodiments, each described herein, the weight ratio of component d to component b is ≤10, or ≤9.5, or ≤9.0 or ≤8.5, or ≤8.0.

In one embodiment, or a combination of two or more embodiments, each described herein, the composition comprises ≥85.0 wt %, or ≥88.0 wt %, or ≥90.0 wt %, or ≥95.0 wt %, or ≥98.0 wt %, or ≥99.0 wt % of the sum of components a, b, c and d, based on the weight of the composition. In one embodiment, or a combination of two or more embodiments, each described herein, the composition comprises ≤100.0 wt %, or ≤99.9 wt %, or ≤99.8 wt %, or ≤99.7 wt %, or ≤99.6 wt %, or ≤99.5 wt % of the sum of components a, b, c and d, based on the weight of the composition.

In one embodiment, or a combination of two or more embodiments, each described herein, the composition further comprises an oil (component e).

In one embodiment, or a combination of two or more embodiments, each described herein, the composition has a melt viscosity (177° C.)≥400 mPa·s, or ≥600 mPa·s, or ≥800 mPa·s, or ≥900 mPa·s, or ≥1,000 mPa·s, or ≥1,100 mPa·s, or ≥1,200 mPa·s. In one embodiment, or a combination of two or more embodiments, each described herein, the composition has a melt viscosity (177° C.)≤5,000 mPa·s, or ≤4,500 mPa·s, or ≤4,000 mPa·s, or 3,500 mPa·s, or ≤3,000 mPa·s, or ≤2,500 mPa·s, or ≤2,000 mPa·s, or ≤1,500 mPa·s, or ≤1,450 mPa·s, or ≤1,400 mPa·s, or ≤1,350 mPa·s, or ≤1,300 mPa·s, or ≤1,250 mPa·s.

In one embodiment, or a combination of two or more embodiments, each described herein, the composition has a Fiber Tear at −20° C.≥50%, or ≥55%, or ≥60%, or ≥65%, or ≥70%, or ≥75%, or ≥80%, or ≥85%, or ≥90%. In one embodiment, or a combination of two or more embodiments, each described herein, the composition has a Fiber Tear at 0° C.≥60%, or ≥65%, or ≥70%, or ≥75%, or ≥80%, or ≥85%, or ≥90%, or ≥95%, or ≥100%. In one embodiment, or a combination of two or more embodiments, each described herein, the composition has a Fiber Tear at 60° C.≥70%, or ≥75%, or ≥80%, or ≥85%, or ≥90%, or ≥92%, or ≥94%, or ≥96%, or ≥98%, or ≥96%.

In one embodiment, or a combination of two or more embodiments, each described herein, the composition has a PAFT value ≥50° C., or ≥55° C., or ≥58° C., or ≥59° C., or ≥60° C., or ≥61° C., or ≥62° C., or ≥63° C., or ≥64° C. In one embodiment, or a combination of two or more embodiments, each described herein, the composition has a SAFT value 70%, or ≥75%, or ≥80° C., or ≥85° C., or ≥88° C., or ≥90° C., or ≥92° C., or ≥94° C., or ≥96° C., or ≥98° C., or ≥100° C., or ≥102° C., or ≥104° C.

In one embodiment, or a combination of two or more embodiments, each described herein, the composition is an adhesive, and further a hot melt adhesive or a pressure sensitive adhesive, and further a hot melt adhesive.

Also provided is an article comprising at least one component formed from the composition of any one embodiment, or a combination of two or more embodiments, each described herein.

In one embodiment, or a combination of two or more embodiments, each described herein, the article is a package or a container.

In one embodiment, or a combination of two or more embodiments, each described herein, the article is a hygiene product.

Ethylene/Alpha-Olefin Interpolymers

The ethylene/alpha-olefin interpolymer comprises, in polymerize form, ethylene, and an alpha-olefin. Alpha-olefins include, but are not limited to, a C3-C20 alpha-olefins, further C3-C10 alpha-olefins, further C3-C8 alpha-olefins, such as propylene, 1-butene, 1-hexene, and 1-octene.

Waxes

Waxes include, but are not limited to, paraffin waxes; microcrystalline waxes; high density, low molecular weight ethylene-based polymer waxes or propylene-based polymer waxes; thermally degraded waxes; by-product polyethylene waxes; Fischer-Tropsch waxes; and mixtures of two or more of these waxes.

Tackifiers

Tackifiers are known in the art, and may be solids, semi-solids, or liquids at room temperature. Tackifiers include, but are not limited to, aliphatic, cycloaliphatic and aromatic hydrocarbons and modified hydrocarbons and hydrogenated versions; and mixtures of two or more of these tackifiers. Tackifiers also include terpenes, modified terpenes, and hydrogenated versions of such terpenes; and rosins, rosin derivatives, and hydrogenated versions of such rosins; and mixtures of two or more of these tackifiers.

Oils

Non-limiting examples of oils include olefin oligomers, low molecular weight polyolefins such as liquid polybutene, phthalates, mineral oils such as naphthenic, paraffinic (e.g., CATENEX oil), or hydrogenated (white) oils (e.g., KAYDOL oil), vegetable and animal oils and their derivatives, petroleum derived oils, and combinations thereof. In one embodiment, or a combination of two or more embodiments, each described herein, the oil is selected from mineral oils, hydrogenated oils or petroleum derived oils.

Other Additives

An inventive composition may include one or more additives. In an embodiment, the composition comprises at least one antioxidant. An antioxidant protects the composition from degradation caused by reaction with oxygen, induced by such things as heat, light, or residual catalyst present in a commercial material. Suitable antioxidants include those commercially available from BASF, such as, IRGANOX 1010, IRGANOX B225, IRGANOX 1076 and IRGANOX 1726. These antioxidants, which act as radical scavengers, may be used alone, or in combination with other antioxidants, such as phosphite antioxidants, like IRGAFOS 168, also available from BASF. In an embodiment, the composition comprises from 0.01 wt %, or 0.02 wt %, or 0.04 wt %, or 0.06 wt %, or 0.08 wt %, or 0.10 wt %, or 0.20 wt % or 0.30 wt %, to 0.40 wt %, or 0.50 wt %, or 0.60 wt %, or 0.80 wt % or 1.00 wt % of at least one antioxidant. Weight percent is based on total weight of the composition.

Definitions

Unless stated to the contrary, implicit from the context, or customary in the art, all parts and percentages are based on weight, and all test methods are current as of the filing date of this disclosure.

The term "composition," as used herein, includes a mixture of materials, which comprise the composition, as well as reaction products and decomposition products formed from the materials of the composition. Any reaction product or decomposition product is typically present in trace or residual amounts.

The term "polymer," as used herein, refers to a polymeric compound prepared by polymerizing monomers, whether of the same or a different type. The generic term polymer thus, includes the term homopolymer (employed to refer to polymers prepared from only one type of monomer, with the understanding that trace amounts of impurities can be incorporated into the polymer structure), and the term interpolymer as defined hereinafter. Trace amounts of impurities, such as catalyst residues, can be incorporated into and/or within the polymer. Typically, a polymer is stabilized with very low amounts ("ppm" amounts) of one or more stabilizers, such as one or more antioxidants.

The term "interpolymer," as used herein, refers to a polymer prepared by the polymerization of at least two different types of monomers. The term interpolymer thus includes the term copolymer (employed to refer to polymers prepared from two different types of monomers) and polymers prepared from more than two different types of monomers.

The term "olefin-based polymer," as used herein, refers to a polymer that comprises, in polymerized form, 50 wt % or a majority weight percent of an olefin, such as ethylene or propylene (based on the weight of the polymer), and optionally may comprise one or more comonomers.

The term "propylene-based polymer," as used herein, refers to a polymer that comprises, in polymerized form, a majority weight percent of propylene (based on the weight of the polymer), and optionally may comprise one or more comonomers.

The term "ethylene-based polymer," as used herein, refers to a polymer that comprises, in polymerized form, 50 wt % or a majority weight percent of ethylene (based on the weight of the polymer), and optionally may comprise one or more comonomers.

The term "ethylene/alpha-olefin interpolymer," as used herein, refers to a random interpolymer that comprises, in polymerized form, 50 wt % or a majority weight percent of ethylene (based on the weight of the interpolymer), and an alpha-olefin.

The term, "ethylene/alpha-olefin copolymer," as used herein, refers to a random copolymer that comprises, in polymerized form, 50 wt % or a majority amount of ethylene monomer (based on the weight of the copolymer), and an alpha-olefin, as the only two monomer types.

The phrase "a majority weight percent," as used herein, in reference to a polymer (or interpolymer, or terpolymer or copolymer), refers to the amount of monomer present in the greatest amount in the polymer.

The terms "comprising," "including," "having," and their derivatives, are not intended to exclude the presence of any additional component, step or procedure, whether the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step or procedure, excepting those that are not essential to operability. The term "consisting of" excludes any component, step or procedure, not specifically delineated or listed.

Listing of Some Composition Features

A] A composition comprising the following components:
- a) a first ethylene/alpha-olefin interpolymer that comprises the following properties:
  - i) a melt viscosity (177° C.) from 2,000 to 50,000 mPa·s,
  - ii) a density from 0.855 to 0.885 g/cc;
- b) a second ethylene/alpha-olefin interpolymer that comprises the following properties:
  - i) a melt viscosity (177° C.) from 2,000 to 50,000 mPa·s,
  - ii) a density from 0.900 to 0.960 g/cc; and wherein the weight ratio of component a to component b is from 1.0 to 100.

B] The composition of A] above, where the density ratio of component b to component a is ≥1.02, or ≥1.03, or ≥1.04, or ≥1.05, or ≥1.06.

C] The composition of A] or B] above, where the density ratio of component b to component a is ≤1.12, or ≤1.11, or ≤1.10 or ≤1.09, or ≤1.08.

D] The composition of any one of A]-C] (A] through C]) above, where the weight ratio of component a to component b is ≤90, or ≤80, or ≤70, or ≤60, or ≤50, or ≤40, or ≤30, or ≤20, or ≤15, or ≤10 or ≤9.5, or ≤9.0, or ≤8.5 or ≤8.0, or ≤7.5 or ≤7.0.

E] The composition of any one of A]-D] above, where the weight ratio of component a to component b is ≥1.0, or ≥1.2, or ≥1.4, or ≥1.6, or ≥1.8, or ≥2.0, or ≥2.2, or ≥2.4, or ≥2.6, or ≥2.8, or ≥3.0.

F] The composition of any one of A]-E] above, where the melt viscosity (177° C.) ratio of component b to component a is ≥0.80, or ≥0.85, or ≥0.90, or ≥0.95, or ≥1.00, or ≥1.02, or ≥1.05.

G] The composition of any one of A]-F] above, where the melt viscosity (177° C.) ratio of component b to component a is ≤1.20, or ≤1.15, or ≤1.12, or ≤1.10 or ≤1.08.

H] The composition of any one of A]-G] above, wherein the first ethylene/alpha-olefin interpolymer (component a) has a density ≥0.856 g/cc, or ≥0.858 g/cc, or ≥0.860 g/cc, or ≥0.862 g/cc, or ≥0.864 g/cc, or ≥0.866 g/cc, or ≥0.868 g/cc, or ≥0.870 g/cc, or ≥0.872 g/cc (1 cc=1 $cm^3$).

I] The composition of any one of A]-H] above, wherein the first ethylene/alpha-olefin interpolymer (component a) has a density ≤0.884 g/cc, or ≤0.882 g/cc, or ≤0.880 g/cc, or ≤0.878 g/cc, or ≤0.876 g/cc, or ≤0.875 g/cc.

J] The composition of any one of A]-I] above, wherein the second ethylene/alpha-olefin interpolymer (component b) has a density ≥0.905 g/cc, or ≥0.910 g/cc, or ≥0.915 g/cc, or ≥0.920 g/cc, or ≥0.922 g/cc, or ≥0.924 g/cc, or ≥0.926 g/cc, or ≥0.928 g/cc (1 cc=1 $cm^3$).

K] The composition of any one of A]-J] above, wherein the second ethylene/alpha-olefin interpolymer (component b) has a density ≤0.955 g/cc, or ≤0.950 g/cc, or ≤0.945 g/cc, or ≤0.940 g/cc, or ≤0.938 g/cc, or ≤0.936 g/cc, or ≤0.934 g/cc, or ≤0.932 g/cc.

L] The composition of any one of A]-K] above, wherein the first ethylene/alpha-olefin interpolymer (component a) has a melt viscosity (177° C.)≥3,000 mPa·s, or ≥4,000 mPa·s, or ≥5,000 mPa·s, or ≥6,000 mPa·s, or ≥7,000 mPa·s, or ≥8,000 mPa·s, or ≥9,000 mPa·s, or ≥10,000 mPa·s, or ≥11,000 mPa·s, or ≥12,000 mPa·s, or ≥13,000 mPa·s, or ≥14,000 mPa·s, or ≥15,000 mPa·s, or ≥16,000 mPa·s.

M] The composition of any one of A]-L] above, wherein the first ethylene/alpha-olefin interpolymer (component a) has a melt viscosity (177° C.) 45,000 mPa·s, or ≤40,000 mPa·s, or ≤35,000 mPa·s, or ≤30,000 mPa·s, or ≤28,000 mPa·s, or ≤26,000 mPa·s, or ≤24,000 mPa·s, or ≤22,000 mPa·s, or ≤20,000 mPa·s, or ≤19,000 mPa·s, or ≤18,500 mPa·s, or K 18,000 mPa·s, or ≤17,500 mPa·s.

N] The composition of any one of A]-M] above, wherein the second ethylene/alpha-olefin interpolymer (component b) has a melt viscosity (177° C.)≥3,000 mPa·s, or ≥4,000 mPa·s, or ≥5,000 mPa·s, or ≥6,000 mPa·s, or ≥7,000 mPa·s, or ≥8,000 mPa·s, or ≥9,000 mPa·s, or ≥10,000 mPa·s, or ≥11,000 mPa·s, or ≥12,000 mPa·s, or ≥13,000 mPa·s, or ≥14,000 mPa·s, or ≥15,000 mPa·s, or ≥16,000 mPa·s.

O] The composition of any one of A]-N] above, wherein the second ethylene/alpha-olefin interpolymer (component b) has a melt viscosity (177° C.) 45,000 mPa·s, or ≤40,000 mPa·s, or ≤35,000 mPa·s, or ≤30,000 mPa·s, or ≤28,000 mPa·s, or ≤26,000 mPa·s, or ≤24,000 mPa·s, or ≤22,000 mPa·s, or ≤20,000 mPa·s, or ≤19,000 mPa·s, or ≤18,500 mPa·s.

P] The composition of any one of A]-O] above, wherein the first ethylene/alpha-olefin interpolymer (component a) has a melting temperature (Tm)≥50° C., or ≥55° C., or ≥58° C., or ≥60° C., or ≥62° C., or ≥64° C., or ≥66° C., or ≥67° C., as determined by DSC.

Q] The composition of any one of A]-P] above, wherein the first ethylene/alpha-olefin interpolymer (component a) has a melting temperature ≤90° C., or ≤88° C., or ≤85° C., or ≤80° C., or ≤78° C., or ≤76° C., or ≤74° C., or ≤72° C., as determined by DSC.

R] The composition of any one of A]-Q] above, wherein the first ethylene/alpha-olefin interpolymer (component a) has a glass transition temperature (Tg)≥−70° C., or ≥−65° C., or ≥−60° C., as determined by DSC.

S] The composition of any one of A]-R] above, wherein the first ethylene/alpha-olefin interpolymer (component a) has a glass transition temperature (Tg)≤−30° C., or ≤−35° C., or ≤−40° C., or ≤−45° C., or ≤−50° C., or ≤−55° C., as determined by DSC.

T] The composition of any one of A]-S] above, wherein the first ethylene/alpha-olefin interpolymer (component a) has a percent crystallinity ≥10%, or ≥11%, or ≥12%, or ≥13%, or ≥14% or ≥15%, as determined by DSC.

U] The composition of any one of A]-T] above, wherein the first ethylene/alpha-olefin interpolymer (component a) has a percent crystallinity ≤40%, or ≤35%, or ≤30%, or ≤28%, or ≤26%, or ≤24%, or ≤22%, as determined by DSC.

V] The composition of any one of A]-U] above, wherein the second ethylene/alpha-olefin interpolymer (component b) has a melting temperature (Tm)≥80° C., or ≥85° C., or ≥90° C., or ≥95° C., or ≥98° C., or ≥100° C., or ≥112° C., or ≥114° C., as determined by DSC.

W] The composition of any one of A]-V] above, wherein the second ethylene/alpha-olefin interpolymer (component b) has a melting temperature ≤145° C., or ≤140° C., or ≤135° C., or ≤130° C., or ≤128° C., or ≤126° C., or ≤124° C., or ≤122° C., or ≤120° C., as determined by DSC.

X] The composition of any one of A]-W] above, wherein the first ethylene/alpha-olefin interpolymer (component a) has a melt index (I2)≥200, or ≥250, or ≥300, or ≥350, or ≥400, or ≥450, or ≥500 dg/min.

Y] The composition of any one of A]-X] above, wherein the first ethylene/alpha-olefin (component a) has a melt index (I2) 2000, or ≤1800, or ≤1700, or ≤1600, or ≤1500, or K 1400, or ≤1300, or ≤1200, or ≤1100, or ≤1000 dg/min, or ≤800 dg/min.

Z] The composition of any one of A]-Y] above, wherein the second ethylene/alpha-olefin interpolymer (component b) has a melt index (I2)≥200, or ≥250, or ≥300, or ≥350, or ≥400, or ≥450, or ≥500 dg/min.

A2] The composition of any one of A]-Z] above, wherein the second ethylene/alpha-olefin (component b) has a melt index (I2)≤2000≤1800, or ≤1700, or ≤1600, or ≤1500, or ≤1400, or ≤1300, or ≤1200, or ≤1100 or ≤1000 dg/min, or ≤800 dg/min.

B2] The composition of any one of A]-A2] above, wherein the first ethylene/alpha-olefin (component a) has a weight average molecular weight Mw≥10,000 g/mol, or ≥15,000 g/mol, or ≥20,000 g/mol, or ≥25,000 g/mol, or ≥30,000 g/mol, or ≥32,000 g/mol, or ≥34,000 g/mol, or ≥35,000 g/mol.

C2] The composition of any one of A]-B2] above, wherein the first ethylene/alpha-olefin (component a) has a weight average molecular weight Mw≤100,000 g/mol, or ≤80,000 g/mol, or ≤60,000 g/mol, or ≤55,000 g/mol, or ≤50,000 g/mol, or ≤48,000 g/mol, or K 46,000 g/mol, or ≤44,000 g/mol, or ≤42,000 g/mol, or ≤40,000 g/mol.

D2] The composition of any one of A]-C2] above, wherein the first ethylene/alpha-olefin (component a) has a number average molecular weight Mn≥6,000 g/mol, or ≥8,000 g/mol, or ≥10,000 g/mol, or ≥12,000 g/mol, or ≥15,000 g/mol.

E2] The composition of any one of A]-D2] above, wherein the first ethylene/alpha-olefin (component a) has a number average molecular weight ≤50,000 g/mol, or ≤40,000 g/mol, or ≤30,000 g/mol, or ≤28,000 g/mol, or ≤26,000 g/mol, or ≤24,000 g/mol, or ≤22,000 g/mol, or ≤20,000 g/mol, or ≤18,000 g/mol.

F2] The composition of any one of A]-E2] above, wherein the first ethylene/alpha-olefin (component a) has a molecular weight distribution (Mw/Mn)≥1.80, or ≥1.90, or ≥1.95, or ≥2.00, or ≥2.05, or ≥2.10, or ≥2.15, or ≥2.20, or ≥2.25.

G2] The composition of any one of A]-F2] above, wherein the first ethylene/alpha-olefin (component a) has a molecular weight distribution (Mw/Mn)≤3.00, or ≤2.90, or ≤2.80, or K 2.70, or ≤2.60, or ≤2.50, or ≤2.40, or ≤2.30.

H2] The composition of any one of A]-G2] above, wherein the alpha-olefin of the first ethylene/alpha-olefin interpolymer (component a) is a C3-C20 alpha-olefin, and further a C3-C10 alpha-olefin, and further a C3-C8 alpha-olefin. 12] The composition of any one of A]-H2] above, wherein the alpha-olefin of the first ethylene/alpha-olefin interpolymer (component a) is selected from propylene, 1-butene, 1-pentene, 1-hexene or 1-octene, and further propylene, 1-butene or 1-octene, and further 1-butene or 1-octene, and further 1-octene.

J2] The composition of any one of A]-I2] above, wherein the first ethylene/alpha-olefin interpolymer (component a) is an ethylene/alpha-olefin copolymer.

K2] The composition of any one of A]-J2] above, wherein the first ethylene/alpha-olefin interpolymer (component a) is selected from the following: an ethylene/propylene copolymer, an ethylene/butene copolymer, or an ethylene/octene copolymer, and further an ethylene/butene copolymer, or an ethylene/octene copolymer, and further an ethylene/octene copolymer.

L2] The composition of any one of A]-K2] above, wherein the alpha-olefin of the second ethylene/alpha-olefin interpolymer (component b) is a C3-C20 alpha-olefin, and further a C3-C10 alpha-olefin, and further a C3-C8 alpha-olefin.

M2] The composition of any one of A]-L2] above, wherein the alpha-olefin of the second ethylene/alpha-olefin interpolymer (component b) is selected from propylene, 1-butene, 1-pentene, 1-hexene or 1-octene, and further propylene, 1-butene, 1-hexene or 1-octene, and further 1-butene, 1-hexene or 1-octene, and further 1-hexene or 1-octene, and further 1-hexene.

N2] The composition of any one of A]-M2] above, wherein the second ethylene/alpha-olefin interpolymer (component b) is an ethylene/alpha-olefin copolymer.

O2] The composition of any one of A]-N2] above, wherein the second ethylene/alpha-olefin interpolymer (component b) is selected from the following: an ethylene/propylene copolymer, an ethylene/butene copolymer, an ethylene/hexene copolymer, or an ethylene/octene copolymer, and further an ethylene/butene copolymer, an ethylene/hexene copolymer, or an ethylene/octene copolymer, and further an ethylene/hexene copolymer or an ethylene/octene copolymer and further an ethylene/hexene copolymer P2] The composition of any one of A]-02] above, wherein the composition comprises ≥30 wt %, ≥32 wt %, or ≥34 wt %, or ≥36 wt %, or ≥38 wt % of the sum of components a and b, based on the weight of the composition.

Q2] The composition of any one of A]-P2] above, wherein the composition comprises ≤50 wt %, or ≤48 wt %, ≤46 wt %, or ≤44 wt %, or ≤42 wt % of the sum of components a and b, based on the weight of the composition.

R2] The composition of any one of A]-Q2] above, wherein the composition comprises ≥10 wt %, or ≥12 wt %, or ≥14 wt %, or ≥16 wt %, or ≥18 wt %, or ≥20 wt % of component a, based on the weight of the composition.

S2] The composition of any one of A]-R2] above, wherein the composition comprises ≤50 wt %, or ≤48 wt %, or ≤45 wt %, or ≤40 wt %, or ≤38 wt %, or ≤37 wt %, or ≤36 wt %, or ≤35 wt % of component a, based on the weight of the composition.

T2] The composition of any one of A]-S2] above, wherein the composition comprises ≥2.0 wt %, or ≥3.0 wt %, or ≥4.0 wt %, or ≥5.0 wt %, or ≥6.0 wt %, or ≥7.0 wt %, or ≥8.0 wt %, or ≥9.0 wt %, or ≥10 wt % of component b, based on the weight of the composition.

U2] The composition of any one of A]-T2] above, wherein the composition comprises ≤40 wt %, or ≤35 wt %, or ≤30 wt %, or ≤28 wt %, or ≤26 wt %, or ≤24 wt %, or ≤22 wt %, or ≤20 wt %, or ≤15 wt % of component b, based on the weight of the composition.

V2] The composition of any one of A]-U2] above, wherein the composition further comprises a wax (component c).

W2] The composition of V2] above, wherein the composition comprises ≥2.0 wt %, or ≥5.0 wt %, or ≥10.0 wt %, or ≥12.0 wt %, or ≥14.0 wt %, or ≥16.0 wt %, or ≥18.0 wt % of the wax (component c), based on the weight of the composition.

X2] The composition of V2] or W2] above, wherein the composition comprises ≤40.0 wt %, or ≤35.0 wt %, or ≤30.0 wt %, or ≤28.0 wt %, or ≤26.0 wt %, or ≤24.0 wt %, or ≤22.0 wt %, or ≤20.0 wt % of the wax, based on the weight of the composition.

Y2] The composition of any one of V2]-X2] above, wherein wax (component c) has a density ≥0.920 g/cc, or ≥0.925 g/cc, or ≥0.930 g/cc, or ≥0.932 g/cc, or ≥0.934 g/cc, or ≥0.936 g/cc, or ≥0.938 g/cc, or ≥0.940 g/cc, or ≥0.942 g/cc (1 cc=1 $cm^3$).

Z2] The composition of any one of V2]-Y2] above, wherein the wax (component c) has a density ≤0.960 g/cc, or ≤0.958 g/cc, or ≤0.956 g/cc, or ≤0.954 g/cc, or ≤0.952 g/cc, or ≤0.950 g/cc, or ≤0.948 g/cc, or ≤0.946 g/cc.

A3] The composition of any one of V2]-Z2] above, wherein the wax (component c) has a melt viscosity (135° C.)≥1.0 mPa·s, or ≥2.0 mPa·s, or ≥3.0 mPa·s, or ≥4.0 mPa·s, or ≥5.0 mPa·s, or ≥6.0 mPa·s.

B3] The composition of any one of V2]-A3] above, wherein the wax (component c) has a melt viscosity (135° C.)≤50 mPa·s, or ≤45 mPa·s, or ≤40 mPa·s, or ≤35 mPa·s, or ≤30 mPa·s, or ≤25 mPa·s, or 20 mPa·s, or ≤18 mPa·s, or ≤14 mPa·s, or ≤12 mPa·s, or ≤10 mPa·s.

C3] The composition of any one of V2]-B3] above, where the weight ratio of component c to component b is ≥0.5, or ≥1.0, or ≥1.5, or ≥2.0, or ≥2.5, or ≥3.0.

D3] The composition of any one of V2]-C3] above, where the weight ratio of component c to component b is ≤6.0, or ≤5.5, or ≤5.0, or ≤4.5, or ≤4.0.

E3] The composition of any one of V2]-D3] above, where the weight ratio of component a to component c is ≥0.8, or ≥0.9, or ≥1.0, or ≥1.1, or ≥1.2, or ≥1.3, or ≥1.4.

F3] The composition of any one of V2]-E3] above, where the weight ratio of component a to component c is ≤2.0, or ≤1.9, or ≤1.8 or ≤1.7, or ≤1.6.

G3] The composition of any one of V2]-F3] above, wherein the composition comprises ≥40 wt %, ≥45 wt %, or ≥50 wt %, or ≥55 wt %, or ≥58 wt % of the sum of components a, b and c, based on the weight of the composition.

H3] The composition of any one of V2]-G3] above, wherein the composition comprises ≤80 wt %, or ≤75 wt %, or ≤70 wt %, ≤65 wt %, or ≤62 wt %, or ≤60 wt % of the sum of components a, b and c, based on the weight of the composition.

I3] The composition of any one of V2]-H3] above, wherein the wax is an ethylene-based polymer wax.

J3] The composition of any one of A]-I3] above, wherein the composition further comprises a tackifier (component d).

K3] The composition of J3] above, wherein the composition comprises ≥20 wt %, or ≥25 wt %, or ≥30 wt %, or ≥35 wt %, or ≥38 wt %, or ≥39 wt % of the tackifier (component d), based on the weight of the composition.

L3] The composition of J3] or K3] above, wherein the composition comprises ≤70 wt %, or ≤65 wt %, or ≤60 wt %, or ≤55 wt %, or ≤50 wt %, or ≤45 wt %, or ≤42 wt %, or ≤40 wt % of the tackifier (component d), based on the weight of the composition.

M3] The composition of any one of J3]-L3] above, wherein the tackifier (component d) has a melt viscosity (160° C.)≥500 mPa·s, or ≥550 mPa·s, or ≥600 mPa·s, or ≥650 mPa·s, or ≥700 mPa·s, or ≥750 mPa·s, or ≥780 mPa·s.

N3] The composition of any one of J3]-M3] above, wherein the tackifier (component d) has a viscosity (160° C.)≤1000 mPa·s, or ≤950 mPa·s, or 900 mPa·s, or ≤850 mPa·s, or ≤820 mPa·s, or ≤800 mPa·s.

O3] The composition of any one of J3]-N3] above, where the weight ratio of component d to component b is ≥1.0, or ≥1.2, or ≥1.4, or ≥1.6, or ≥1.8, or ≥1.9.

P3] The composition of any one of J3]-03] above, where the weight ratio of component d to component b is ≤10, or ≤9.5, or ≤9.0 or ≤8.5, or ≤8.0.

Q3] The composition of any one of J3]-P3] above, where the weight ratio of component d to component a is ≥0.8, or ≥0.9, or ≥1.0, or ≥1.1, or ≥1.2.

R3] The composition of any one of J3]-Q3] above, where the weight ratio of component d to component a is ≤3.0, or ≤2.8, or ≤2.6, or ≤2.4, or ≤2.2, or ≤2.0, or ≤1.8, or ≤1.6.

S3] The composition of any one of J3]-R3] above, wherein the composition comprises ≥60 wt %, ≥65 wt %, or ≥70 wt %, or ≥75 wt %, or ≥78 wt % of the sum of components a, b and d, based on the weight of the composition.

T3] The composition of any one of J3]-S3] above, wherein the composition comprises ≤95 wt %, or ≤90 wt %, or ≤85 wt %, or ≤82 wt %, or ≤80 wt % of the sum of components a, b and d, based on the weight of the composition.

U3] The composition of any one of J3]-T3] above, where the weight ratio of component d to component c is ≥1.0, or ≥1.2, or ≥1.4, or ≥1.6, or ≥1.8, or ≥1.9.

V3] The composition of any one of J3]-U3] above, where the weight ratio of component d to component c is ≤3.0, or ≤2.8, or ≤2.6, or ≤2.4, or ≤2.2, or ≤2.0.

W3] The composition of any one of J3]-V3] above, wherein the composition comprises ≥85.0 wt %, or ≥88.0 wt %, or ≥90.0 wt %, or ≥95.0 wt %, or ≥98.0 wt %, or ≥99.0 wt % of the sum of components a, b, c and d, based on the weight of the composition.

X3] The composition of any one of J3]-W3] above, wherein the composition comprises ≤100.0 wt %, or ≤99.9 wt %, or ≤99.8 wt %, or ≤99.7 wt %, or ≤99.6 wt %, or ≤99.5 wt % of the sum of components a, b, c and d, based on the weight of the composition.

Y3] The composition of any one of A]-X3] above, wherein the composition has a melt viscosity (177° C.)≥400 mPa·s, or ≥600 mPa·s, or ≥800 mPa·s, or ≥900 mPa·s, or ≥1,000 mPa·s, or ≥1,100 mPa·s, or ≥1,200 mPa·s.

Z3] The composition of any one of A]-Y3] above, wherein the composition has a melt viscosity (177° C.)≤5,000 mPa·s, or ≤4,500 mPa·s, or ≤4,000 mPa·s, or ≤3,500 mPa·s, or ≤3,000 mPa·s, or ≤2,500 mPa·s, or ≤2,000 mPa·s, or ≤1,500 mPa·s, or ≤1,450 mPa·s, or ≤1,400 mPa·s, or ≤1,350 mPa·s, or ≤1,300 mPa·s.

A4] The composition of any one of A]-Z3] above, wherein the composition has a Fiber Tear at −20° C.≥50%, or ≥55%, or ≥60%, or ≥65%, or ≥70%, or ≥75%, or ≥80%, or ≥85%, or ≥90%.

B4] The composition of any one of A]-A4] above, wherein the composition has a Fiber Tear at 0° C.≥60%, or ≥65%, or ≥70%, or ≥75%, or ≥80%, or ≥85%, or ≥90%, or ≥95%, or ≥100%.

C4] The composition of any one of A]-B4] above, wherein the composition has a Fiber Tear at 23° C.≥70%, or ≥75%, or ≥80%, or ≥85%, or ≥90%, or ≥92%, or ≥94%, or ≥95%, or ≥100%.

D4] The composition of any one of A]-C4] above, wherein the composition has a Fiber Tear at 60° C.≥70%, or ≥75%, or ≥80%, or ≥85%, or ≥90%, or ≥92%, or ≥94%, or ≥96%, or ≥98%, or ≥96%.

E4] The composition of any one of A]-D4] above, wherein the composition has a PAFT value ≥50° C., or ≥55° C., or ≥58° C., or ≥59° C., or ≥60° C., or ≥61° C., or ≥62° C., or ≥63° C., or ≥64° C.

F4] The composition of any one of A]-E4] above, wherein the composition has a SAFT value ≥70° C., or ≥75° C., or ≥80° C., or ≥85° C., or ≥88° C., or ≥90° C., or ≥92° C., or ≥94° C., or ≥96° C., or ≥98° C., or ≥100° C., or ≥102° C., or ≥104° C.

G4] The composition of any one of A]-F4] above, wherein the composition has an open time ≥2.0 s, or ≥4.0 s, or ≥6.0 s, or ≥8.0 s, or ≥10 s.

H4] The composition of any one of A]-G4] above, wherein the composition has a set time 4.0 s, or 3.5 s, or 3.0 s, or 2.5 s, or ≤2.0 s.

I4] The composition of any one of A]-H4] above, wherein the composition further comprises a thermoplastic polymer, different from both the first ethylene/alpha-olefin interpolymer (component a) and the second ethylene/alpha-olefin interpolymer (component b), in one or more features, such as monomer types, monomer distributions, monomer amounts, density, melt viscosity (177° C.), Mn, Mw, Mz, MWD, V0.1, V100, RR, or any combination thereof, and further in one or more features, such as monomer types, monomer distributions, monomer amounts, density, melt viscosity (177° C.), Mn, Mw, MWD, or any combination thereof.

J4] The composition of any one of A]-I4] above, wherein the composition further comprises an oil (component e).

K4] The composition of any one of A]-J4] above, wherein the composition is an adhesive, and further a hot melt adhesive or a pressure sensitive adhesive, and further a hot melt adhesive.

L4] An article comprising at least one component formed from the composition of any one of A]-K4] above.

M4] The article of L4] above, wherein the article is a package or a container.

N4] The article of L4] above, wherein the article is a hygiene product.

O4] The article of N4] above, wherein the hygiene product is a diaper or an incontinence pad.

P4] A method of forming an adhesive, said method comprising mixing the composition of any one of A]-J4] above.

Test Methods

Melt Viscosity

Melt viscosity was measured in accordance with ASTM D 3236, using a Brookfield Viscometer (Model DV0III, version 3), and a SC-31 hot-melt viscometer spindle, at the following temperatures: a) 177° C. for the ethylene/alpha-olefin interpolymer; and b) 177° C. for the composition. This method can also be used to measure the melt viscosity of the wax (at 135° C.) and the melt viscosity of the tackifier (at 160° C.). The sample was poured into an aluminum disposable tube-shaped chamber, which was, in turn, inserted into a Brookfield Thermosel, and locked into place. The sample chamber had a notch on the bottom that fit the bottom of the Brookfield Thermosel, to ensure that the chamber was not allowed to turn, when the spindle was inserted and spinning. The sample (approximately 8-10 grams) was heated to the required temperature, until the melted sample was one inch below the top of the sample chamber. The viscometer apparatus was lowered, and the spindle was submerged into the middle of the sample chamber, wherein the spindle did not touch the sides of the chamber. Lowering was continued, until the brackets on the viscometer aligned on the Thermosel. The viscometer was turned on, and set to operate at a steady shear rate, which led to a torque reading in the range of 40 to 60 percent of the total torque capacity, based on the rpm output of the viscometer. Readings were taken every minute, for 15 minutes, or until the values stabilized, at which point, a final reading was recorded.

Fiber Tear

Fiber Tear (%) of each adhesive composition was determined according to a standardized method, using INLAND corrugated carton. The composition was heated to 177° C., and then a bead of the composition was applied (at a weight of 2.1 gram per meter) on to a corrugated carton coupon (25.4 mm×76.2 mm), by drawing the sample composition lengthwise down the coupon with a spatula or hot melt applicator. A second coupon was quickly placed (within 5 seconds) on top of the applied composition, with a pressure of 2.5 bar (250 kPa) for 10 seconds, to hold the bond in place. Test samples were conditioned for 24 hours at 23° C. (room temperature), and then conditioned at the respective test temperature (−20° C., 0° C., 23° C. and 60° C.) for at least 24 hours. Immediately after conditioning, samples (n=5) were pulled apart by inserting the blade of a spatula under one corner to fold up the corner of the coupon. The test sample was then placed on a horizontal surface, with the side having the folded corner facing up. The folded corner was manually pulled as rapidly as possible, at approximately a 45°-90° angle, relative to the coupon's lengthwise axis, to tear the adhesive bond. When applicable, the test sample was held as near as possible to the heating source or the cooling source, each set at the respective test temperature, during this manual pull. The percent of torn fiber remaining on the surface of the adhesive composition (fiber tear) was estimated in 25% increments (that is, 0%, 25%, 50%, 75%, and 100%), and the average value of the five test samples was recorded.

Peel Adhesion Failure Temperature (PAFT) and Shear Adhesion Failure Temperature (SAFT)

Peel Adhesion Failure Temperature (PAFT) was tested according to ASTM D 4498, with a 100 gram weight, using a Cheminstruments OSI-8 programmable oven. Each test sample was initially equilibrated at 40° C. in the oven for 10 minutes, and the oven temperature was increased at an average rate of 0.5° C./minute. The temperature at which the adhesive bond failed was recorded. Each test sample was in a peel mode configuration with the 100 gram weight.

Shear Adhesion Failure Temperature (SAFT) was measured according to ASTM D 4498, with a 500 gram weight, using a Cheminstruments OSI-8 programmable oven. Each test sample was initially equilibrated at 40° C. in the oven for 10 minutes, and the oven temperature was increased at an average rate of 0.5° C./minute. The temperature at which the adhesive bond failed was recorded. Each test sample was in a shear mode configuration with the 500 gram weight.

Each test sample for PAFT or SAFT testing was prepared using two sheets of "60 g/$m^2$" KRAFT paper, and each sheet was "6 in.×12 in. (152 mm×305 mm)" in dimensions. On the bottom sheet, lengthwise and separated by a gap of one inch (25 mm), were adhered, in parallel fashion, two "1.75 in. or 2 in. (45 mm or 51 mm)" wide strips of a one sided, pressure-sensitive tape such as a masking tape. The two strips of tape were placed, such that the "one inch gap" ran lengthwise, down the center of the bottom sheet.

The adhesive composition to be tested was heated to 177° C. (350° F.), and then drizzled in an even manner down the center of the "one inch gap," formed between the two strips of tape. Then, before the composition could unduly thicken, a bonded paper template was quickly formed as follows. A rod rode immediately down the bottom sheet, leveling the adhesive composition within the gap. This rod was shimmed with a strip of the same tape on each side of the gap. After the pass of this first rod, a second sheet of the KRAFT paper was aligned to, and laid on top of, the bottom sheet, and a second rod rode immediately down this top sheet, to form a bonded paper template. Overall, the first rod evenly spread the composition in the gap region between the tape strips, and the second rod evenly compressed the second sheet over the top of the gap region and over the top of the tape strips. Within the bonded paper template, a single one inch (25.4 mm) wide strip of the adhesive composition bonded the bottom and top paper sheets. The paper template was cut crosswise into strips of "one inch (25.4 mm)" in width" and "three inches (76.2 mm)" in length, to form test samples.

Each test sample had a "one inch×one inch" adhesive bond area in the center, and a bond thickness of about 8 to 10 mils (0.008 to 0.010 inch). Each test sample was conditioned for 24 hours at room temperature (23° C.) and 54% relative humidity. The test samples were then used in the PAFT and SAFT tests, as noted above. For each test, two test samples from each composition were tested, and the average failure temperature recorded.

Set Time and Open Time

Set Time and Open Time were determined using an INATEC Bond Tester, a mechanical testing device used to form and tear test bonds. The INATEC Bond Tester was heated to 173° C., and this temperature was measured via a hand-held thermocouple. The bottom substrate, "2.5 in. (63.5 mm)×2 in. (50.8 mm)" corrugated board, was moved on a track under an adhesive pot, which delivered a bead of adhesive at a range of "0.26 to 0.29 g/linear m." The adhesive pot pressure was increased, or decreased, as needed, in order to maintain a consistent bead size. A top substrate, "2.5 in. (63.5 mm)×2 in. (50.8 mm)" corrugated board, was applied to the bottom substrate, with a pressure of 2.5 bar (250 kPa). The INATEC had two timers, capable of measuring the set-time and the open-time potential to the nearest second.

Set Time Measurement. The Set Time is the minimum compression time required to achieve a fiber tear of at least 50%. For this test, the open time was set at two seconds (sec). A bond was formed, as the top substrate was compressed onto the bottom substrate. After a preset compression time of 5 seconds, a tear test was executed, as the top substrate was pulled from the bottom substrate. A visual assessment was then made to determine the percentage of fiber tear achieved under the preset test conditions. Based on this result, the compression time was increased or decreased in one second intervals, to determine the compression time to achieve 50% or greater fiber tear and the compression time to achieve less than 50% fiber tear. The Set Time was recorded as the shortest compression time at which at least 50% fiber tear was obtained.

Open Time Measurement. Open Time is the longest test time between the adhesive application to one substrate, and the bonding with a second substrate, and which bond results in at least a 50% fiber tear. For testing, the compression time was set as 15 seconds. For the Open Time measurement, the test time was preset at 10 seconds, and increased in 10 second intervals, until less than 50% fiber tear was achieved. The test time was noted for the % fiber tear starting to drop below 50%, and then the test time was decreased by 5 seconds, and the % fiber tear was determined. The test time required for the % fiber tear to start to drop below 50% was noted. Finally, the test time was decreased by one second intervals, relative to this second noted time, to determine the maximum test time to achieve at least 50% fiber tear.

Differential Scanning Calorimetry (DSC)

Differential Scanning Calorimetry (DSC) was used to measure Tm, Tc, Tg and crystallinity in ethylene-based (PE) and propylene-based (PP) polymer samples. Each sample (0.5 g) was compression molded into a film, at 25000 psi, 190° C., for 10-15 seconds. About 5 to 8 mg of film sample was weighed and placed in a DSC pan. The lid was crimped on the pan to ensure a closed atmosphere. The sample pan was placed in a DSC cell, and then heated, at a rate of approximately 10° C./min, to a temperature of 180° C. for PE (230° C. for PP). The sample was kept at this temperature for three minutes. Then the sample was cooled at a rate of 10° C./min to −90° C. for PE (−60° C. for PP), and kept isothermally at that temperature for three minutes. The sample was next heated at a rate of 10° C./min, until complete melting (second heat). Unless otherwise stated, melting point (Tm) and the glass transition temperature (Tg) of each polymer sample were determined from the second heat curve, and the crystallization temperature (Tc) was determined from the first cooling curve. The Tg and the respective peak temperatures for the Tm and the Tc are noted. The percent crystallinity can be calculated by dividing the heat of fusion (Hf), determined from the second heat curve, by a theoretical heat of fusion of 292 J/g for PE (165 J/g for PP), and multiplying this quantity by 100 (for example, % cryst.=(Hf/292 J/g)×100 (for PE)).

Density

The density of a polymer is measured by preparing the polymer sample according to ASTM D 1928, and then measuring the density according to ASTM D792, Method B, within one hour of sample pressing.

Melt Index

The melt index (I2) of an ethylene-based polymer is measured in accordance with ASTM D-1238, condition 190° C./2.16 kg. The melt flow rate (MFR) of a propylene-based polymer is measured in accordance with ASTM D-1238, condition 230° C./2.16 kg.

Gel Permeation Chromatography

The chromatographic system consists of a PolymerChar GPC-IR (Valencia, Spain) high temperature GPC chromatograph, equipped with an internal IR5 infra-red detector (IR5). The autosampler oven compartment is set at 1600 Celsius, and the column compartment is set at 150° Celsius. The columns are four AGILENT "Mixed A" 30 cm, 20-micron linear mixed-bed columns. The chromatographic solvent is 1,2,4-trichlorobenzene, which contained 200 ppm of butylated hydroxytoluene (BHT). The solvent source is nitrogen sparged. The injection volume is 200 microliters, and the flow rate is 1.0 milliliters/minute.

Calibration of the GPC column set is performed with 21 narrow molecular weight distribution polystyrene standards, with molecular weights ranging from 580 to 8,400,000, and which are arranged in six "cocktail" mixtures, with at least a decade of separation between individual molecular weights. The standards are purchased from Agilent Technologies. The polystyrene standards are prepared at "0.025 grams in 50 milliliters" of solvent, for molecular weights equal to, or greater than, 1,000,000, and at "0.05 grams in 50 milliliters" of solvent, for molecular weights less than 1,000,000. The polystyrene standards are dissolved at 800 Celsius, with gentle agitation, for 30 minutes. The polystyrene standard peak molecular weights are converted to polyethylene molecular weights using Equation 1 (as described in Williams and Ward, J. Polym. Sci., Polym. Let., 6, 621 (1968)): $M_{polyethylene}=A\times(M_{polystyrene})^B$ (EQ1), where M is the molecular weight, A has a value of 0.4315 and B is equal to 1.0.

A fifth order polynomial is used to fit the respective polyethylene equivalent calibration points. A small adjustment to A (from approximately 0.375 to 0.445) is made to correct for column resolution and band-broadening effects, such that linear homopolymer polyethylene standard is obtained at 120,000 Mw.

The total plate count of the GPC column set is performed with decane (prepared at "0.04 g in 50 milliliters" of TCB, and dissolved for 20 minutes with gentle agitation). The plate count (Equation 2) and symmetry (Equation 3) are measured on a 200 microliter injection according to the following equations:

$$\text{Plate Count} = 5.54 * \left( \frac{(RV_{Peak\,Max}}{\text{Peak Width at } \frac{1}{2} \text{ height}} \right)^2, \quad \text{(EQ 2)}$$

where RV is the retention volume in milliliters, the peak width is in milliliters, the peak max is the maximum height of the peak, and ½ height is ½ height of the peak maximum; and $$\text{Symmetry} = \frac{(\text{Rear Peak } RV_{one\,tenth\,height} - RV_{Peak\,max})}{(RV_{Peak\,max} - \text{Front Peak } RV_{one\,tenth\,height})}, \quad \text{(EQ 3)}$$

where RV is the retention volume in milliliters, and the peak width is in milliliters, Peak max is the maximum position of the peak, one tenth height is 1/10 height of the peak maximum, and where rear peak refers to the peak tail at later retention volumes than the peak max, and where front peak refers to the peak front at earlier retention volumes than the peak max. The plate count for the chromatographic system should be greater than 18,000, and symmetry should be between 0.98 and 1.22.

Samples are prepared in a semi-automatic manner with the PolymerChar "Instrument Control" Software, wherein the samples are weight-targeted at "2 mg/ml," and the solvent (contained 200 ppm BHT) is added to a pre nitrogen-sparged, septa-capped vial, via the PolymerChar high temperature autosampler. The samples are dissolved for two hours at 1600 Celsius under "low speed" shaking.

The calculations of $Mn_{(GPC)}$, $Mw_{(GPC)}$, and $Mz_{(GPC)}$ are based on GPC results using the internal IR5 detector (measurement channel) of the PolymerChar GPC-IR chromatograph according to Equations 4-6, using PolymerChar GPCOne™ software, the baseline-subtracted IR chromatogram at each equally-spaced data collection point (i), and the polyethylene equivalent molecular weight obtained from the narrow standard calibration curve for the point (i) from Equation 1. Equations 4-6 are as follows:

$$Mn_{(GPC)} = \frac{\sum^{i} IR_i}{\sum^{i} \left( IR_i / M_{polyethylene_i} \right)}, \quad \text{(EQ 4)}$$

-continued $$Mw_{(GPC)} = \frac{\sum^{i} \left( IR_i * M_{polyethylene_i} \right)}{\sum^{i} IR_i}, \quad \text{(EQ 5)}$$

$$\text{and } Mz_{(GPC)} = \frac{\sum^{i} \left( IR_i * M^2_{polyethylene_i} \right)}{\sum^{i} \left( IR_i * M_{polyethylene_i} \right)}. \quad \text{(EQ 6)}$$

In order to monitor the deviations over time, a flowrate marker (decane) is introduced into each sample, via a micropump controlled with the PolymerChar GPC-IR system. This flowrate marker (FM) is used to linearly correct the pump flowrate (Flowrate(nominal)) for each sample, by RV alignment of the respective decane peak within the sample (RV(FM Sample)), to that of the decane peak within the narrow standards calibration (RV(FM Calibrated)). Any changes in the time of the decane marker peak are then assumed to be related to a linear-shift in flowrate (Flowrate (effective)) for the entire run. To facilitate the highest accuracy of a RV measurement of the flow marker peak, a least-squares fitting routine is used to fit the peak of the flow marker concentration chromatogram to a quadratic equation. The first derivative of the quadratic equation is then used to solve for the true peak position. After calibrating the system, based on a flow marker peak, the effective flowrate (with respect to the narrow standards calibration) is calculated from Equation 7:

Flowrate(effective)=Flowrate(nominal)*(RV(FM Calibrated)/RV(FM Sample)) (EQ7).

Processing of the flow marker peak is done via the PolymerChar GPCOne™ software. Acceptable flowrate correction is such that the effective flowrate should be within +/−0.7% of the nominal flowrate.

EXPERIMENTAL

The components for the compositions are shown in Table 1. Formulated compositions and their adhesive properties are shown in Table 2.

TABLE 1

Materials for Compositions

| Component | Specification | Source |
|---|---|---|
| AFFINITY GA 1950 | Ethylene/octene copolymer<br>Density = 0.874 g/cc<br>Melt viscosity at 177° C. (Brookfield) = 17,000 mPa · s (or cP)<br>Tm = 70° C., Tg = −57° C., % cryst. = 18% | The Dow Chemical Co. |
| XUS 61850.00 | Ethylene/hexene copolymer<br>Density = 0.930 g/cc; Tm = 115° C.<br>Melt viscosity at 177° C. (Brookfield) = 18,000 mPa · s (or cP) | The Dow Chemical Co. |
| ESCOREZ 5400 | Tackifier-hydrogenated hydrocarbon resin<br>Ring and ball softening point = 103.4° C.<br>Form = Flake<br>Melt viscosity at 160° C. (Brookfield) = 800 mPa · s (or cP)<br>Color (YI) = 0.6 | Exxon |
| SASOLWAX H1 | Fischer Tropsch wax, ethylene-based polymer wax<br>density = 0.944 g/cc<br>acid number = <0.1 mg KOH/g<br>congealing point = 96-100° C.<br>drop melting point = 112° C.<br>melt viscosity at 135° C. (Brookfield) = 6-10 mPa · s (or cP) | Sasol |

TABLE 1-continued

| Materials for Compositions | | |
|---|---|---|
| Component | Specification | Source |
| IRGANOX 1010 (AO) | Antioxidant pentaerythritol tetrakis(3-(3,5-di-tert-butyl-4-hydroxyphenyl)propionate) (CAS 6683-19-8) density = 1.15 g/cc | BASF |

Note, the equation "I2 = [3.6126(10$^{(log(\eta)-6.6928)/-1.1363)}$ − 9.3185], where η (cP or mPa · s) = melt viscosity at 350° F. (177° C.)" can be used to calculate melt index (2.16 kg, 190° C.). See U.S. Pat. No. 7,199,180 (footnote to Table 1).

Preparation of Adhesive Composition

For each composition, the corresponding components, as shown in Table 2, were weighed into an iron container, preheated in an oven, at a temperature of 177° C., for 30 minutes. The mixture was then melt blended in a heated block, at a temperature of 177° C., for 10 minutes, with a "Paravisc style" mixing head, running at 100 rotations per minute (rpm). As discussed, the compositions are shown in Table 2 below.

TABLE 2

| Compositions* | | Ex. 1 | Ex. 2 | Ex. 3 | CS. 1 | CS. 2 | CS. 3 |
|---|---|---|---|---|---|---|---|
| AFFINITY GA 1950 | | 35 | 30 | 20 | 40 | 10 | 0 |
| XUS 61850.00 | | 5 | 10 | 20 | 0 | 30 | 40 |
| ESCOREZ 5400 (tackifier) | | 39.5 | 39.5 | 39.5 | 39.5 | 39.5 | 39.5 |
| Sasol H1 (wax) | | 20 | 20 | 20 | 20 | 20 | 20 |
| AO | | 0.5 | 0.5 | 0.5 | 0.5 | 0.5 | 0.5 |
| Total | | 100% | 100% | 100% | 100% | 100% | 100% |
| Viscosity† @ 177° C. mPa · s | | 1206 | 1217 | 1228 | 1200 | 1235 | 1250 |
| PAFT (° C.) | | 62.5 | 64.2 | 74.6 | 61.7 | 79.7 | 83.7 |
| SAFT (° C.) | | 102.2 | 107.4 | 108.6 | 91.3 | 109.2 | 108.4 |
| Open Time (s) | | 15 | 14 | 11 | 25 | — | — |
| Set Time (s) | | 2 | 1.5 | 1 | 2 | — | — |
| Fiber Tear (%)‡ | −20° C. | 93 | 90 | 75 | 100 | 0 | 0 |
| | 0° C. | 100 | 100 | 81 | 100 | 0 | 0 |
| | 23° C. | 100 | 100 | 95 | 100 | 30 | 0 |
| | 60° C. | 98 | 96 | 99 | 100 | 66 | 0 |

CS = Comparative Sample

*Table values are weight percent (wt %), based on the total weight of the composition.

†Viscosity of the composition

‡Fiber tear percentage on corrugated carton

Open time and set time for each of CS. 2 and CS. 3 were not measured, as the fiber tear percentages were very low.

As seen in Table 2, the inventive compositions have a better balance of adhesive properties as compared to the comparative compositions. The inventive compositions (Exs. 1-3) have Fiber Tear values across the temperature range (−20° C., 0° C., 23° C., 60° C.; ≥75% for corrugated carbon) that are extremely higher than those values for the comparative compositions CS. 2 and CS. 3. Also, the inventive compositions have SAFT values (≥100° C.) that are significantly higher than the value for comparative composition CS. 1, and have higher PAFT values than the value for this comparative composition.

The invention claimed is:

1. A composition comprising the following components:

a first ethylene/alpha-olefin interpolymer that comprises the following properties:

i) a melt viscosity (177° C.) from 2,000 to 50,000 mPa·s, ii) a density from 0.855 to 0.885 g/cc;

a second ethylene/alpha-olefin interpolymer that comprises the following properties:

i) a melt viscosity (177° C.) from 2,000 to 50,000 mPa·s, ii) a density from 0.900 to 0.960 g/cc; and wherein the first ethylene/alpha-olefin interpolymer and the second ethylene/alpha-olefin interpolymer are non-functionalized; the weight ratio of the first ethylene/alpha-olefin interpolymer to the second ethylene/alpha-olefin interpolymer is from 1.0 to 10; the ratio of the density of the second ethylene/alpha-olefin interpolymer to the density of the first ethylene/alpha-olefin interpolymer is from 1.02 to 1.12; and the ratio of the melt viscosity (177° C.) of the second ethylene/alpha-olefin interpolymer to the melt viscosity (177° C.) of the first ethylene/alpha-olefin interpolymer is from 0.80 to 1.20.

2. The composition of claim 1, wherein the first ethylene/alpha-olefin interpolymer is an ethylene/alpha-olefin copolymer.

3. The composition of claim 1, wherein the second ethylene/alpha-olefin interpolymer is an ethylene/alpha-olefin copolymer.

4. The composition of claim 1, wherein the composition comprises from 30 wt % to 50 wt % of the sum of the first ethylene/alpha-olefin interpolymer and the second ethylene/alpha-olefin interpolymer, based on the weight of the composition.

5. The composition of claim 1, wherein the composition further comprises a tackifier.

6. The composition of claim 1, wherein the composition further comprises an oil.

7. The composition of claim 1, wherein the composition further comprises a wax and a tackifier and wherein the composition comprises from 85.0 wt % to 100.0 wt % of the sum of the first ethylene/alpha-olefin interpolymer, the second ethylene/alpha-olefin interpolymer, the wax and the tackifier, based on the weight of the composition.

8. The composition of claim 1, wherein the composition has a melt viscosity (177° C.) from 400 mPa·s to 5,000 mPa·s.

9. The composition of claim 1, wherein the composition has a Fiber Tear at −20° C.≥50%.

10. The composition of claim 1, wherein the composition has a Fiber Tear at 0° C.≥60%.

11. The composition of claim 1, wherein the composition has a Fiber Tear at 60° C.≥70%.

12. The composition of claim 1, wherein the composition has a PAFT value ≥50° C.

13. The composition of claim 1, wherein the composition has a SAFT value ≥70° C.

14. The composition of claim 1, wherein the composition further comprises a wax.

15. The composition of claim 14, wherein the wax has a melt viscosity (135° C.) from 1.0 mPa·s to 50 mPa·s.

16. The composition of claim 14, wherein the weight ratio of the wax to the second ethylene/alpha-olefin interpolymer is from 0.5 to 6.0.

17. An article comprising at least one part formed from the composition of claim 1.

* * * * *